(12) United States Patent
Ahn et al.

(10) Patent No.: US 9,695,836 B2
(45) Date of Patent: Jul. 4, 2017

(54) FLY WHEEL

(71) Applicants: Sang Tae Ahn, Daejeon (KR); Chun Young Ahn, Daejeon (KR)

(72) Inventors: Sang Tae Ahn, Daejeon (KR); Chun Young Ahn, Daejeon (KR)

(73) Assignees: Sang Tae Ahn (KR); Chun Young Ahn (KR)

( * ) Notice: Subject to any disclaimer, the term of this patent is extended or adjusted under 35 U.S.C. 154(b) by 326 days.

(21) Appl. No.: 14/423,250

(22) PCT Filed: Jul. 3, 2013

(86) PCT No.: PCT/KR2013/005874
§ 371 (c)(1),
(2) Date: Feb. 23, 2015

(87) PCT Pub. No.: WO2014/030835
PCT Pub. Date: Feb. 27, 2014

(65) Prior Publication Data
US 2015/0260196 A1    Sep. 17, 2015

(30) Foreign Application Priority Data
Aug. 22, 2012 (KR) .......................... 10-2012-0091544

(51) Int. Cl.
*F01D 1/32* (2006.01)
*F04D 29/26* (2006.01)
(Continued)

(52) U.S. Cl.
CPC .............. *F04D 29/26* (2013.01); *F01D 1/32* (2013.01); *F03G 3/08* (2013.01); *F16F 15/30* (2013.01);
(Continued)

(58) Field of Classification Search
CPC ........ F01D 1/32; F01D 5/141; F04D 29/2216; F03G 3/08; B60Y 2400/162
See application file for complete search history.

(56) References Cited

U.S. PATENT DOCUMENTS 3,332,235 A * 7/1967 Wilhite .................... F01D 1/32
239/223
3,879,152 A * 4/1975 Eskeli ...................... F01D 1/32
415/1
(Continued)

FOREIGN PATENT DOCUMENTS

| JP | 05079083 | 10/1993 |
| JP | 10184801 | 7/1998 |

(Continued)

OTHER PUBLICATIONS

International Search Report—PCT/KR2013/005874 dated Oct. 1, 2013.

*Primary Examiner* — Ninh H Nguyen
(74) *Attorney, Agent, or Firm* — Cantor Colburn LLP

(57) ABSTRACT

Provided is a fly wheel, including: a fly wheel body provided with a receiving part in which air is filled and mounted on driving shaft; a blade radially coupled to the fly wheel body, including a ventilation passage formed therein to be communicated with the receiving part and a puncturing part formed on an outer race thereof to be communicated with the ventilation passage, and generating thrust by discharging the air filled in the receiving part to the puncturing part at the time of rotating the driving shaft; and a check valve installed on the fly wheel body and being opened and closed by a pressure difference between the receiving part and the outside.

5 Claims, 6 Drawing Sheets

(51) Int. Cl.
*F03G 3/08* (2006.01)
*F16F 15/30* (2006.01)
(52) U.S. Cl.
CPC ..... *B60Y 2400/162* (2013.01); *F16F 2226/00* (2013.01)

(56) References Cited

U.S. PATENT DOCUMENTS

| | | | | |
|---|---|---|---|---|
| 4,024,705 | A | * | 5/1977 | Hedrick ................ F02C 3/165 60/39.183 |
| 4,453,885 | A | * | 6/1984 | Denton .................... F01D 1/32 415/63 |
| 7,091,635 | B1 | | 8/2006 | Gilliland et al. |
| 2003/0113209 | A1 | | 6/2003 | Wasson et al. |

FOREIGN PATENT DOCUMENTS

| | | |
|---|---|---|
| KR | 1020030053909 | 7/2003 |
| KR | 1020060055128 | 5/2006 |
| KR | 1020120045573 | 5/2012 |

\* cited by examiner

FLY WHEEL

TECHNICAL FIELD

The present invention relates to a fly wheel mounted on a driving shaft including a crank shaft of an engine or a rotating shaft of a motor.

BACKGROUND ART

In general, power generated from an internal combustion engine burns fuel within a cylinder to generate a high pressure in the cylinder, wherein the power is obtained by rotating a crank shaft of an engine using the high pressure.

In this case, since pressure in the cylinder is changed, torque generated from the crank shaft of the engine is not constant. In order to prevent a mismatch of the above-mentioned torque of the engine, an engine according to the related art has attempted to prevent the torque mismatch by mounting a fly wheel on the crank shaft to serve as inertia against a rotation.

The above-mentioned fly wheel is manufactured in a circular shape having a predetermined radius in order to uniformly maintain rotation force transferred from the crank shaft and to uniform a rotation speed.

According to the related art, Korean Patent No. 1148132 discloses an energy storage apparatus converting surplus power to store the converted surplus power as energy, the energy storage apparatus including a motor converting received electrical energy into mechanical energy; a fly wheel storing a rotation force generated by driving the motor; and a chamber receiving the fly wheel, wherein the fly wheel includes a rotating shaft having a first intaglio part formed on an outer peripheral surface thereof, a rotating body having a second intaglio part formed on an inner peripheral surface thereof, enclosing the outer peripheral surface of the rotating shaft and installed to be spaced apart from the rotating shaft, and a sliding hub inserted into the first and second intaglio parts and transferring the rotation force of the rotating shaft to the rotating body. However, according to the related art, the sliding hub decreases the rotation speed of the fly wheel and stores rotation energy of the fly wheel.

However, the fly wheel according to the related art is configured of a simple mass body and is rotated by the driving of the motor. In the case in which the driving of the motor is stopped, the fly wheel is rotated to a predetermined degree by inertia force and then stopped, such that it may not maintain the rotation force as much as possible.

In addition, since the fly wheel according to the related art is configured to have the sliding hub storing the rotation energy, the rotation energy of the fly wheel may be stored, but the rotation speed of the fly wheel may be decreased.

Therefore, the development of various fly wheels is demanded in order to solve the above-mentioned problems.

RELATED ART DOCUMENT

Patent Document

Korean Patent No. 1148132 (May 15, 2012)

DISCLOSURE

Technical Problem

An object of the present invention is to provide a fly wheel capable of increasing a rotation speed.

Further, another object of the present invention is to provide a fly wheel capable of maintaining rotation force as much as possible.

Technical Solution

In one general aspect, a fly wheel 1000 includes: a fly wheel body 100 provided with a receiving part 110 in which air is filled and mounted on driving shaft 10; a blade 200 radially coupled to the fly wheel body 100, including a ventilation passage 210 formed therein to be communicated with the receiving part 110 and a puncturing part 220 formed on an outer race thereof to be communicated with the ventilation passage 210, and generating thrust by discharging the air filled in the receiving part 110 to the puncturing part 220 at the time of rotating the driving shaft 10; and a check valve 300 installed on the fly wheel body 100 and being opened and closed by a pressure difference between the receiving part 110 and the outside.

The blade 200 may be formed in a form bent toward a rear of a rotation direction of the driving shaft 10.

The fly wheel 1000 may have the fly wheel body 100 and the blade 200 configured integrally with each other.

The check valve 300 may include: an induction pipe 310 penetrating through one surface of the fly wheel body 100; a first protrusion part 320 formed to be protruded from a predetermined region of an inner surface of the induction pipe 310; a second protrusion part 330 spaced apart from the first protrusion part 320 by a predetermined interval toward the receiving part 110 side and formed to be protruded from the predetermined region of the inner surface of the induction pipe 310; a spring 340 installed between the first protrusion part 320 and the second protrusion part 330; and a cover part 350 opening and closing an open and close space 325 formed in an inner side of the first protrusion part 320.

The cover part 350 may be installed between the first protrusion part 320 and the spring 340, and may open and close the open and close space 325 by the pressure difference between the receiving part 110 and the outside, and elasticity of the spring 340.

Advantageous Effects

As set forth above, a fly wheel according to an embodiment of the present invention is configured to have a blade radially coupled to a fly wheel body and generating thrust when a driving shaft is rotated, such that a rotation speed of the fly wheel may be increased and rotation force of the fly wheel may be maintained as much as possible.

In addition, the blade according to the embodiment of the present invention is configured in a form bent toward a rear of a rotation direction of the driving shaft, thereby making it possible to further increase the rotation speed of the fly wheel.

The fly wheel according to the embodiment of the present invention has the fly wheel body and the blade configured integrally with each other, thereby making it possible to simply manufacture the fly wheel using an injection molding.

In addition, a check valve according to the embodiment of the present invention is installed between a first protrusion part and a spring and has a cover part configured to open or close an open and close space by a pressure difference between a receiving part and the outside, and elasticity of the spring, thereby making it possible to automatically introduce air when external air needs to be introduced into the receiving part.

DESCRIPTION OF DRAWINGS

The above and other objects, features and advantages of the present invention will become apparent from the following description of preferred embodiments given in conjunction with the accompanying drawings, in which.

| [Detailed Description of Main Elements] | |
|---|---|
| 10: driving shaft | 1000: fly wheel |
| 100: fly wheel body | 110: receiving part |
| 200: blade | 210: ventilation passage |
| 220: puncturing part | 300: check valve |
| 310: induction pipe | 320: first protrusion part |
| 325: open and close space | 330: second protrusion part |
| 340: spring | 350: cover part |
| 360: guide part | 365: guide hole |

BEST MODE

Hereinafter, the embodiments of the present invention will be described in detail with reference to accompanying drawings.

Figure 1:
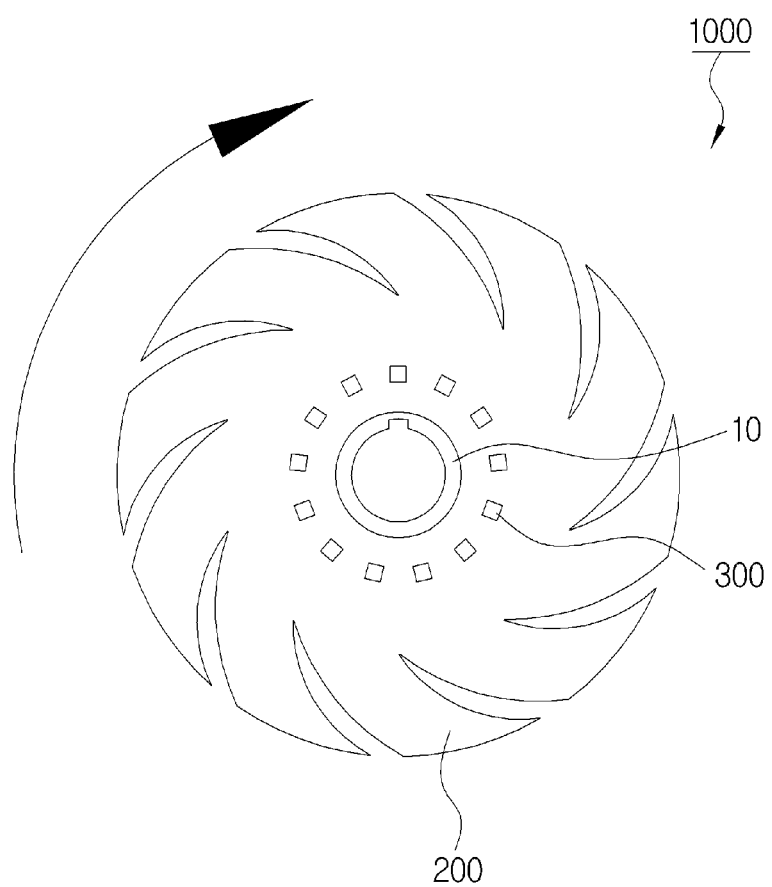
FIG. 1 is a front view of a fly wheel according to an embodiment of the present invention.
Figure 2:
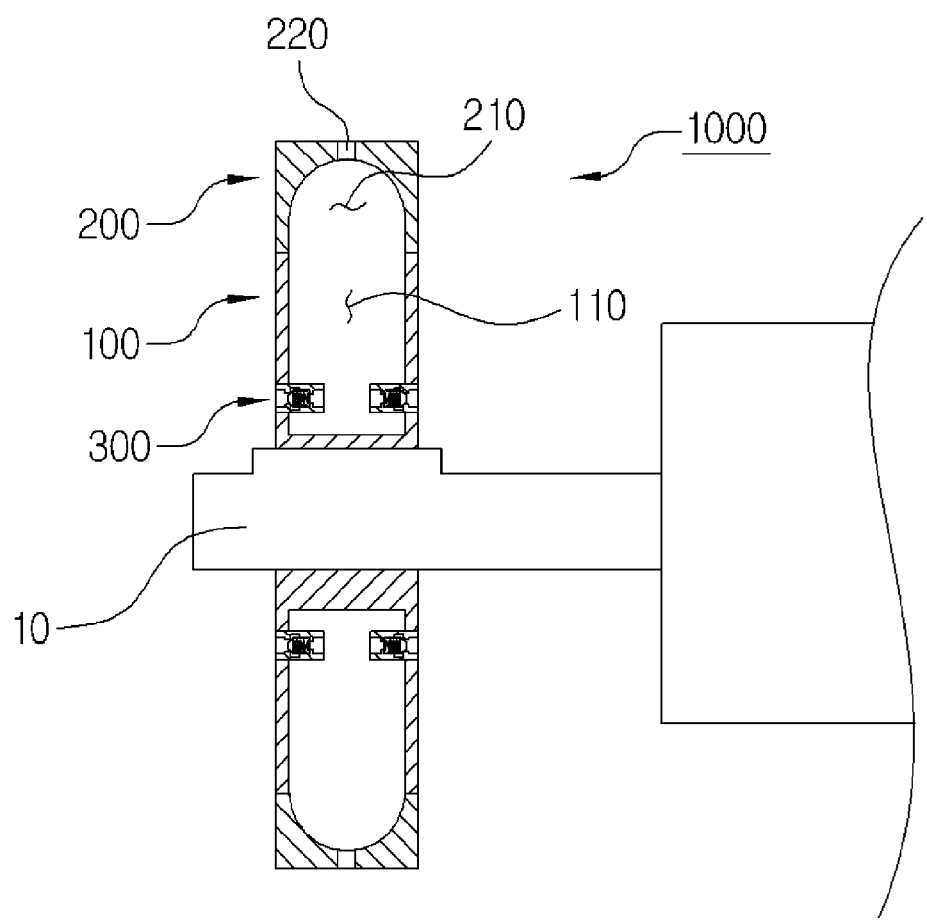
FIG. 2 is a cross-sectional view of the fly wheel according to the embodiment of the present invention.

FIG. 1 is a front view of a fly wheel 1000 according to an embodiment of the present invention and FIG. 2 is a cross-sectional view of the fly wheel 1000 according to the embodiment of the present invention.

As shown in FIG. 1, the fly wheel 1000 according to the embodiment of the present invention is configured to include a fly wheel body 100, a blade 200, and a check valve 300.

The fly wheel body 100 is formed in a disk shape, has a central portion hollowed so as to be mounted on a driving shaft 10 and provided with a receiving part 110 in which air is filled.

Herein, the driving shaft 10 refers to a crank shaft of a vehicle or a rotation shaft of a motor.

The receiving part 110 is a space formed between outer and inner races of the fly wheel body 100

The blade 200, which is a configuration radially coupled to the fly wheel body 100, is configured to include a ventilation passage 210 and a punching part 220.

The ventilation passage 210 is formed in the blade 200 and is communicated with the receiving part 110.

The puncturing part 220 is formed on the outer race of the blade 200 and is communicated with the ventilation passage 210.

The blade 200 generates thrust at the time of rotating the driving shaft 10. A detailed description thereof will be provided below.

When the driving shaft 10 is rotated, the fly wheel body 100 and the blade 200 are together rotated and the air filled in the receiving part 110 is discharged to the puncturing part 220 through the ventilation passage 210 by centrifugal force generated by the rotation of the fly wheel body 100 and the blade 200, thereby generating the thrust at the blade 200.

As such, by thrust generated at the blade 200, the fly wheel 1000 increases a rotation speed thereof and maintains a rotation force thereof as much as possible.

Therefore, the fly wheel 1000 according to the embodiment of the present invention is configured to have a blade 200 radially coupled to the fly wheel body 100 and generating the thrust when the driving shaft 10 is rotated, such that the rotation speed of the fly wheel 1000 may be increased and the rotation force of the fly wheel 1000 may be maintained as much as possible.

The blade 200 is formed in a form bent toward a rear of a rotation direction of the driving shaft 10.

That is, the blade 200 is formed in a form in which the thrust may be generated toward the rear of the rotation direction of the driving shaft 10.

Therefore, the blade 200 according to the embodiment of the present invention is configured in a form bent toward the rear of the rotation direction of the driving shaft 10, thereby making it possible to further increase the rotation speed of the fly wheel 1000.

The fly wheel 1000 according to the embodiment of the present invention may have the fly wheel body 100 and the blade 200 configured integrally with each other.

Therefore, the fly wheel 1000 according to the embodiment of the present invention has the fly wheel body 100 and the blade 200 configured integrally with each other, thereby making it possible to simply manufacture the fly wheel using injection molding.

Meanwhile, in order to continuously generate the thrust at the blade 200 according to the embodiment of the present invention, the air needs to be supplied to the receiving part 110. In according to the present invention, external air is supplied to the receiving part 110 using the check valve 300.

The check valve 300 is installed on the fly wheel body 100 and is opened and closed by a pressure difference between the receiving part 110 and the outside, such that it supplies the external air to the receiving part 110 in the case in which the pressure difference between the receiving part 110 and the outside has a predetermined range or more, and does not supply the external air to the receiving part 110 in the case in which the pressure difference between the receiving part 110 and the outside has a predetermined range or less.

More specifically, the check valve 300 is automatically opened by the pressure difference (the pressure of the receiving part 110< the external pressure) between the receiving part 110 and the outside in the case in which the air filled in the receiving part 110 is discharged to the puncturing part 220 and an amount of air filled in the receiving part 110 is rare, so as to supply the external air to the receiving part 110, and is automatically closed so as not to supply the external air to the receiving part 110 in the case in which the receiving part 110 is fully filled with the air.

An embodiment of the above-mentioned check valve 300 will be described below.

Figure 3:
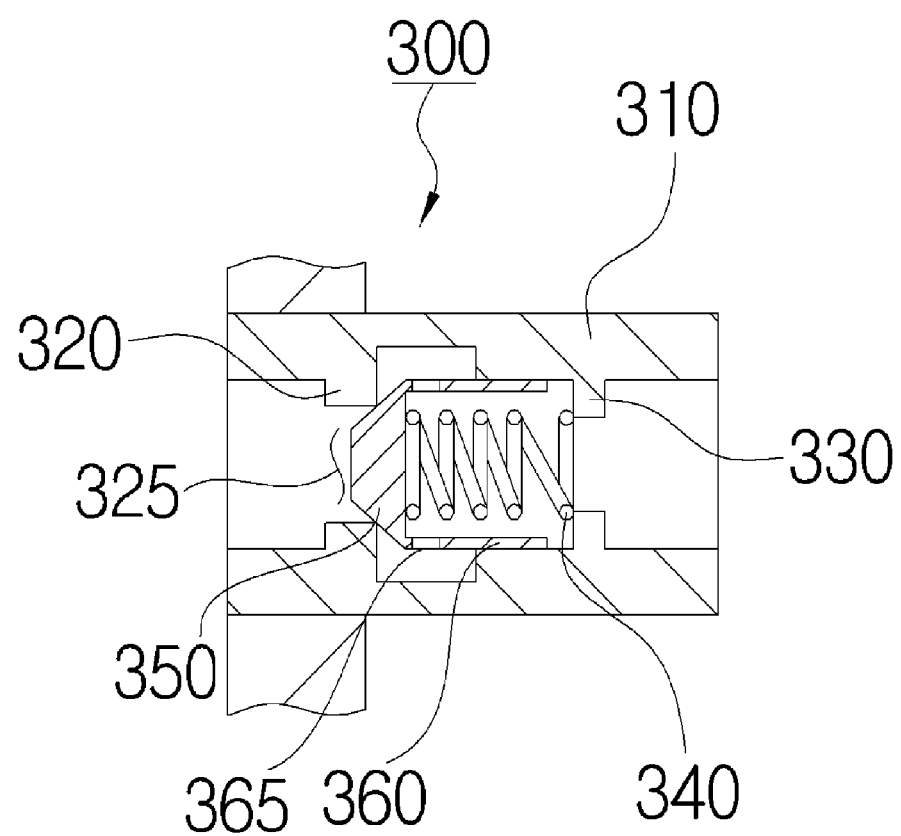
FIG. 3 is an enlarged cross-sectional view of a check valve according to an embodiment of the present invention.

FIG. 3 is an enlarged cross-sectional view of a check valve 300 according to the embodiment of the present invention.

As shown in FIG. 3, the check valve 300 according to the embodiment of the present invention is configured to include an induction pipe 310, a first protrusion part 320, a second protrusion part 330, a spring 340, a cover part 350, and a guide part 360.

The induction pipe 310 penetrates through one surface of the fly wheel body 100 so as to connect the receiving part 110 to the outside.

The first protrusion part 320 is formed to be protruded from a predetermined region of a circumference of an inner surface of the induction pipe 310.

The second protrusion part 330 is spaced apart from the first protrusion part 320 by a predetermined interval toward the receiving part 110 side and is formed to be protruded from a predetermined region of the circumference of the inner surface of the induction pipe 310.

That is, the first protrusion part 320 and the second protrusion part 330 are formed in a ring form, the first protrusion part 320 is formed at a position adjacent to the outside, and the second protrusion part 330 is formed at a position adjacent to the receiving part 110.

The spring 340 is installed between the first protrusion part 320 and the second protrusion part 330.

The cover part 350 is installed between the first protrusion part 320 and the spring 340 so as to be coupled to the spring 340 when defining a space formed in an inner side of the first protrusion part 320 as an open and close space 325, and supplies or does not supply the external air to the receiving part 110 by opening or closing the open and close space 325 by the pressure difference between the receiving part 110 and the outside and elasticity of the spring 340.

In this case, a principal that the cover part 350 opens and closes the open and close space 325 will be described below in more detail.

The cover part 350 is moved toward the second protrusion part 330 side by the pressure difference (the pressure of the receiving part 110< the external pressure) between the receiving part 110 and the outside in the case in which the pressure difference between the receiving part 110 and the outside has a predetermined range or more, so as to open the open and close space 325 and supplies the external air to the receiving part 110, and is moved toward the first protrusion part 320 side by elasticity of the spring 340 in the case in which the pressure difference between the receiving part 110 and the outside has a predetermined range or less, so as to close the open and close space 325 and does not supply the external air to the receiving part 110.

Therefore, the check valve 300 according to the embodiment of the present invention is installed between the first protrusion part 320 and the spring 340 and has the cover part 350 configured to open or close the open and close space 325 by the pressure difference between the receiving part 110 and the outside, and the elasticity of the spring 340, thereby making it possible to automatically introduce the external air when the external air needs to be introduced into the receiving part 110.

The guide part 360, which is a configuration enclosing a circumference of the spring 340 and coupled to the cover part 350, guides the cover part 350 so that the cover part 350 installed between the first protrusion part 320 and the spring 340 may perform a piston motion in the induction pipe 310, and has a guide hole 365 formed at a position adjacent to the cover part 350.

The guide hole 365 is a passage in which the external air is introduced into the receiving part 110 when the cover part 350 opens the open and close space 325.

Meanwhile, the fly wheel 1000 according to the embodiment of the present invention periodically generates the thrust at the time of rotating the driving shaft 10 thereof. A more detailed description thereof will be provided below.

Figure 4:
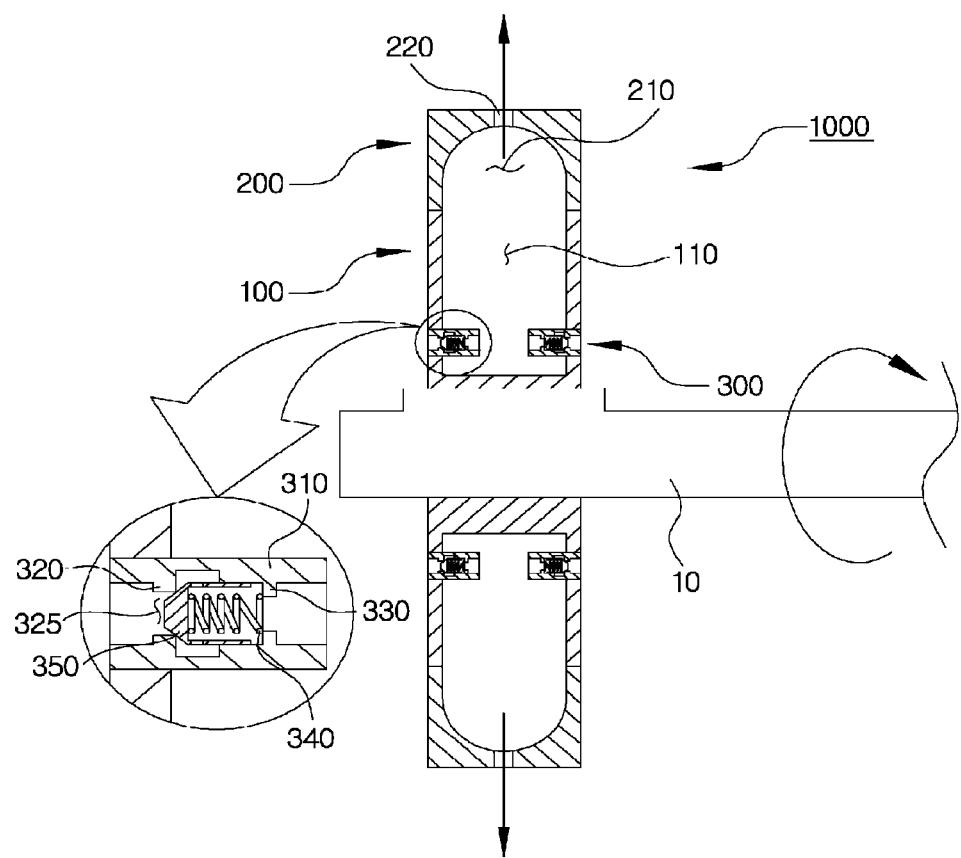
FIGS. 4 to 6 are cross-sectional views showing a principal that the fly wheel according to the embodiment of the present invention periodically generates thrust at the time of rotating a driving shaft thereof.
Figure 5:
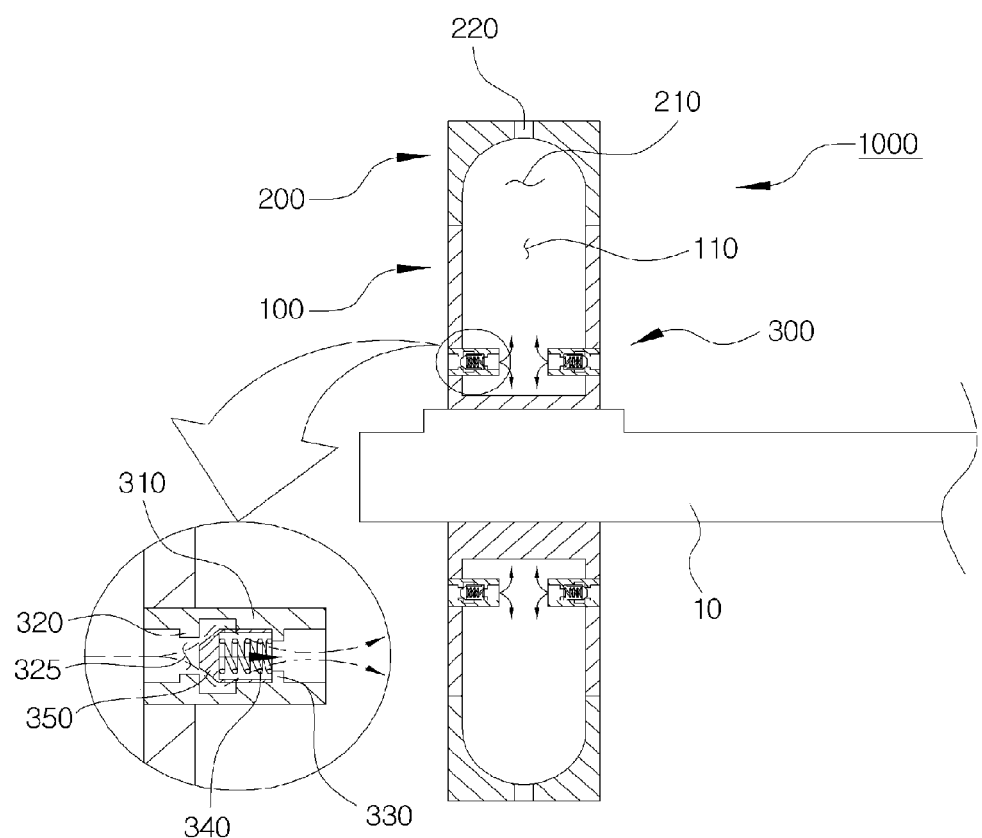
Figure 6:
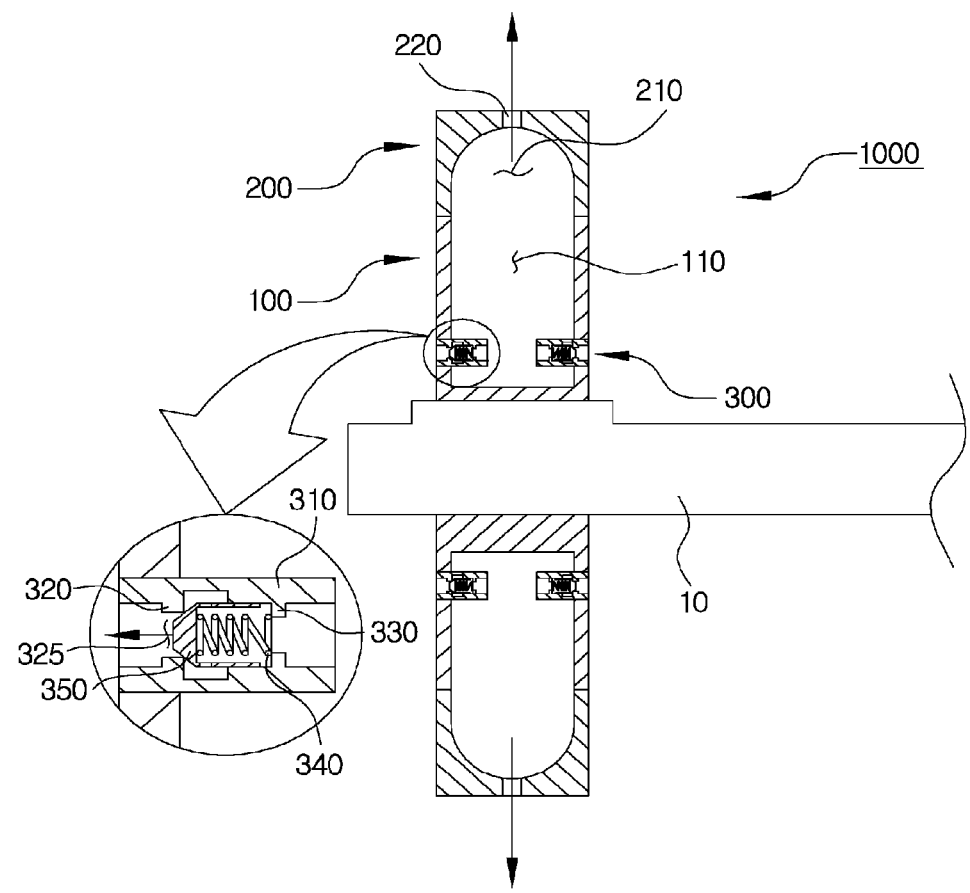

FIGS. 4 to 6 are cross-sectional views showing a principal that the fly wheel 1000 according to the embodiment of the present invention periodically generates the thrust at the time of rotating the driving shaft 10 thereof.

1) When the driving shaft 10 is rotated, the air filled in the receiving part 110 is discharged to the puncturing part 220 through the ventilation passage 210 by the centrifugal force generated from the fly wheel body 100 and the blade 200 rotated together with the driving shaft 10, thereby generating the thrust at the blade 200. In this case, since the pressure difference between the receiving part 110 and the outside has a predetermined range or less, the check valve 300 is closed (see FIG. 4).

2) The check valve 300 is opened by the pressure difference between the receiving part 110 having a rarefied amount of air and the outside so as to supply the external air to the receiving part 110 (see FIG. 5).

3) The pressure difference between the receiving part 110 in which the external air is fully filled and the outside becomes a predetermined range or less and the check valve 300 is again closed, and the external air filled in the receiving part 110 is again discharged to the puncturing part 220 through the ventilation passage 210 by the centrifugal force generated from the fly wheel body 100 and the blade 200 rotated together with the driving shaft 10, thereby again generating the thrust at the blade 200 (see FIG. 6).

4) The above 2) and 3) are repeated, such that the thrust is periodically generated at the blade 200.

The present invention is not limited to the above-mentioned embodiments, and may be variously applied, and may be variously modified without departing from the gist of the present invention claimed in the claims.

The invention claimed is:

1. A fly wheel, comprising:
 a fly wheel body provided with a receiving part in which air is filled and mounted on driving shaft;
 a blade radially coupled to the fly wheel body, including a ventilation passage formed therein to be communicated with the receiving part and a puncturing part formed on an outer race thereof to be communicated with the ventilation passage, and generating thrust by discharging the air filled in the receiving part to the puncturing part at the time of rotating the driving shaft; and
 a check valve installed on the fly wheel body and being opened and closed by a pressure difference between the receiving part and the outside.

2. The fly wheel of claim 1, wherein the blade is formed in a form bent toward a rear of a rotation direction of the driving shaft.

3. The fly wheel of claim 1, wherein the fly wheel has the fly wheel body and the blade configured integrally with each other.

4. The fly wheel of claim 1, wherein the check valve includes:
 an induction pipe penetrating through one surface of the fly wheel body;
 a first protrusion part formed to be protruded from a predetermined region of an inner surface of the induction pipe;
 a second protrusion part spaced apart from the first protrusion part by a predetermined interval toward the receiving part side and formed to be protruded from the predetermined region of the inner surface of the induction pipe;
 a spring installed between the first protrusion part and the second protrusion part; and
 a cover part opening and closing an open and close space formed in an inner side of the first protrusion part.

5. The fly wheel of claim 4, wherein the cover part is installed between the first protrusion part and the spring, and opens and closes the open and close space by the pressure difference between the receiving part and the outside, and elasticity of the spring.

\* \* \* \* \*